United States Patent
Lopez

(10) Patent No.: US 7,788,944 B2
(45) Date of Patent: Sep. 7, 2010

(54) PROCESS AND APPARATUS TO COOL HARVEST GRAPES

(75) Inventor: Mario Lopez, Frouzins (FR)

(73) Assignee: Linde Aktiengesellschaft, Wiesbaden (DE)

( * ) Notice: Subject to any disclaimer, the term of this patent is extended or adjusted under 35 U.S.C. 154(b) by 323 days.

(21) Appl. No.: 10/532,760

(22) PCT Filed: Oct. 24, 2003

(86) PCT No.: PCT/EP03/11854

§ 371 (c)(1),
(2), (4) Date: Nov. 16, 2005

(87) PCT Pub. No.: WO2004/037966

PCT Pub. Date: May 6, 2004

(65) Prior Publication Data

US 2006/0150641 A1    Jul. 13, 2006

(30) Foreign Application Priority Data

Oct. 28, 2002 (DE) .............................. 102 50 138

(51) Int. Cl.
*F25D 3/12* (2006.01)
(52) U.S. Cl. ......................................... 62/384; 62/528
(58) Field of Classification Search ................. 62/52.1, 62/62, 63, 126, 129, 165, 195, 378, 380, 62/371, 384, 407, 603, 64, 374, 434, 528; 99/276, 277.1; 462/11, 15; 426/11, 15, 330, 426/330.3, 330.5; 137/225, 505.14
See application file for complete search history.

(56) References Cited

U.S. PATENT DOCUMENTS

| | | | | |
|---|---|---|---|---|
| 3,737,324 A | * | 6/1973 | Zinchenko et al. | 426/15 |
| 3,741,770 A | * | 6/1973 | Van Olphen | 426/15 |
| 3,910,173 A | * | 10/1975 | Zepponi | 99/277.1 |
| 4,154,161 A | * | 5/1979 | Fisher et al. | 100/51 |
| 4,238,511 A | * | 12/1980 | Egretier | 426/15 |
| 4,615,887 A | * | 10/1986 | Hickinbotham | 426/8 |
| 4,741,167 A | * | 5/1988 | Wigley | 62/62 |
| 4,761,969 A | * | 8/1988 | Moe | 62/388 |
| 4,766,732 A | * | 8/1988 | Rubin | 62/62 |
| 4,891,954 A | * | 1/1990 | Thomsen | 62/239 |
| 4,951,479 A | * | 8/1990 | Araquistain et al. | 62/239 |

(Continued)

FOREIGN PATENT DOCUMENTS

DE    742 748    12/1943

(Continued)

OTHER PUBLICATIONS

Landi L. et al.: Oenological uses of liquid carbon dioxide. Database accession No. 2002-00-h2516 XP002269433.
International Search Report.

*Primary Examiner*—Mohammad M Ali
(74) *Attorney, Agent, or Firm*—Crowell & Moring LLP

(57) ABSTRACT

The invention relates to a process and apparatus to cool harvest grapes, the grapes being transported from a harvest reception vessel (1) to a press (5) or to a maceration vessel (23), characterized in that the grapes are charged with carbon dioxide during transport to the press (5) and/or during transport to the maceration vessel (23). As a result a flavor improvement of the wine is achieved.

13 Claims, 1 Drawing Sheet

U.S. PATENT DOCUMENTS

| | | | |
|---|---|---|---|
| 5,152,155 A * | 10/1992 | Shea et al. | 62/385 |
| 5,271,233 A | 12/1993 | Parker et al. | |
| 5,451,415 A * | 9/1995 | Pera et al. | 426/489 |
| 5,548,974 A * | 8/1996 | Rhoades | 62/604 |
| 6,019,851 A * | 2/2000 | Pittet et al. | 127/2 |
| 6,427,481 B1 * | 8/2002 | Gibot et al. | 62/530 |
| 6,465,026 B2 * | 10/2002 | Grassin et al. | 426/51 |

FOREIGN PATENT DOCUMENTS

| | | |
|---|---|---|
| EP | 0 542 055 A1 | 5/1993 |
| EP | 1 020 514 B1 | 7/2000 |
| EP | 1 096 005 A1 | 5/2001 |
| FR | 2407982 A * | 7/1979 |
| FR | 2 731 228 | 9/1996 |

* cited by examiner

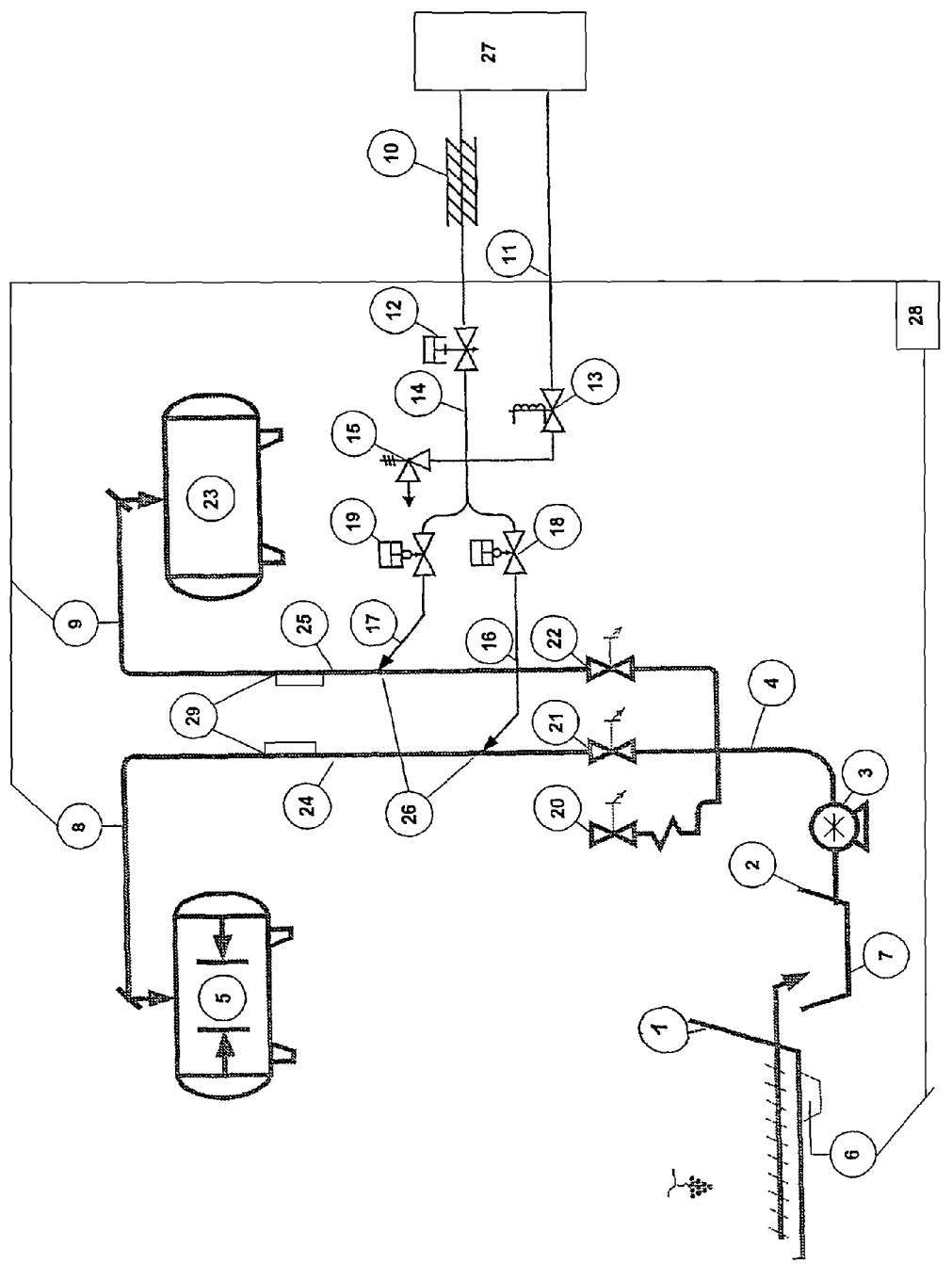

PROCESS AND APPARATUS TO COOL HARVEST GRAPES

The invention relates to a process for producing wine, the grapes being transported from a harvest reception vessel to a press or fed to a maceration vessel. In addition, the invention relates to an apparatus for cooling grapes between a harvest reception vessel and a press or a maceration vessel.

In wine production, the conventional sequence is known in which the grapes after harvest pass into a vessel (harvest reception vessel), from which they are transported to the press. To produce a better wine the grapes are subject to a maceration process for a few hours before the fermentation process. The grapes are put to a maceration vessel to extract flavours from the grape skins. The grapes remain in the maceration vessel for a few hours before the fermentation process begins. There are also wine producing installations that do not comprise a maceration vessel. In this case the maceration takes place in the press. The formation of flavour is particularly effected by the conditions (for example temperature, residence time) in the above-described production steps.

The object underlying the present invention is to provide an improved process and an apparatus suitable for improvement in wine flavour.

On the processing side, the object set is achieved by the fact that the grapes are charged with carbon dioxide during transport to the press and/or maceration vessel.

If the grapes are charged with carbon dioxide during transport to the press and carbon dioxide is introduced into the maceration vessel for cooling the grapes during maceration, an outstanding improvement of the wine taste is achievable.

Expediently, carbon dioxide is brought into contact with the grapes. It has proved to be particularly favorable to add carbon dioxide until the grape temperature is somewhat more than 7° C.

The carbon dioxide is fed to the grapes with great advantage as gaseous carbon dioxide, as liquid carbon dioxide and as solid carbon dioxide or dry ice.

The input of gaseous carbon dioxide creates an inert atmosphere for the grapes.

The input of liquid carbon dioxide causes a significant drop in grape temperature that helps to improve the taste. A drop of temperature is also achievable by introducing cold carbon dioxide gas, preferably cold carbon dioxide gas gained from a liquid carbon dioxide source.

With the injection of liquid carbon dioxide dry ice and gaseous carbon dioxide may be generated depending on the design of the injector. The injection of dry ice is favorable for a smooth cooling down of grape temperature due to the sublimation taking place.

Preferably, the carbon dioxide fed in the liquid state to the grapes is at least in part taken from a reservoir which contains liquid carbon dioxide. Such a reservoir has an advantageously high storage density.

On the apparatus side, the object set is firstly achieved by means of the fact that a feeder is provided for carbon dioxide, via which the carbon dioxide is added to the connection line upstream of the press.

Secondly, the object set is also achieved by means of the fact that a feeder for carbon dioxide is provided in the connection line to the maceration vessel.

According to a particularly preferred embodiment of the invention, both solutions are combined, so that a feeder for carbon dioxide is provided via which the carbon dioxide is added to the connection line upstream of the press and a feeder for carbon dioxide is provided into the connection line to the maceration vessel.

The two embodiments solve the object set of improving the wine flavour not only in each case individually, but also in combination with one another, a particularly outstanding flavour being able to be achieved in the combination.

Expediently, the feeder for carbon dioxide is connected to a reservoir for carbon dioxide which contains liquid and gaseous carbon dioxide.

The invention and other details of the invention will be described in more detail below with reference to an exemplary embodiment shown diagrammatically in the figure. The figure shows a diagram for wine production: the grapes, after harvest, are introduced into the harvest reception vessel 1, from which they are transported to a vessel 2 from which they are fed using a pump 3 via a connection line 4 to the press 5 or to a maceration vessel 23. The way of the grapes is determined by the position of the valves 20, 21 and 22. A plurality of temperature measuring points are installed on the transport path of the grapes and used to determine the respective grape temperature. The inlet temperature is measured by the measuring device 6 and sent to a programmable logic controller (PLC 28). This temperature is compared to a set point (desired temperature) and the amount of carbon dioxide to be fed through valve 12 is calculated by the PLC 28. The valve 12 is a regulation valve, its opening degree is driven by the PLC 28. The valves 18 and 19 are used to choose the line along which the grapes are transported, e.g. to the press 5 or to the maceration vessel 23. The temperature measuring devices 8 and 9 control the temperature after the injection of carbon dioxide. In case of a drop in temperature exceeding a predetermined interval, the injection of carbon dioxide is shut down by the PLC 28. This control function is very important to avoid freezing of the transport pipes and lines, in case the grape flow is not at correct speed.

Carbon dioxide is fed from at least one reservoir 27 for carbon dioxide via a line 10 which bears liquid carbon dioxide and has a pneumatic regulation valve 12, and a line 11 which bears gaseous carbon dioxide and has an electrically operated valve 13. If only one reservoir 27 is present, the line 11 is thus connected to the head space of the reservoir 27 where the carbon dioxide is present in the gaseous state, and the line 10 is disposed further down, so that via the line 10 liquid carbon dioxide can be taken from the reservoir 27. The two lines 10 and 11 are combined into one line 14. The line 14 has a safety valve 15. The carbon dioxide is apportioned between the lines 16 and 17 each of which has an electrically operated valve 18, 19. Opening the electrically operated valve 18 enables carbon dioxide to be introduced into the connection grapes transport line 24. Opening the electrically operated valve 19 enables carbon dioxide to be introduced into the connection line 25 bearing grapes. The valves 20, 21 and 22 represent diagrammatically the possibilities of feeding grapes into the press, the maceration vessel 23 and for further processing. The possibilities result from the potential combinations of the two valve settings (open or closed) for the valves 20, 21 and 22.

In the exemplary embodiment, the use of the programmable logic controller PLC 28 will also be described in more detail. Control points for this controller (PLC 28) are the harvest temperature (measured at the temperature measuring point 6), the grape sensor 7 which determines whether grapes are present in the vessel 2, the valve position of the valves 20, 21 and 22 and the temperature at the temperature measuring points 8 and 9. The controller (PLC 28) first compares the temperature value determined at the temperature measuring point 6 with a pre-set value. If grapes are present in the vessel 2, the pump 3 is started. At least one valve 21, 22 must be open, then the feed of carbon dioxide is also started. The injection line is chosen by opening the valve 18 or 19. First the valve 13 (gaseous state) is open for a few seconds to rise the pressure and clean the injector inside the connection to the grapes transport pipe. Second the valve 12 (liquid state) is open gradually, the valve 13 is closed.

There are two main operating possibilities:

If the users choice is only to protect the grapes by an inert gas during transport, only the valves 18 or 19 and the valve 13 is opened, in case all conditions controlled by the PLC 28 are fulfilled. Carbon dioxide gas is injected during all transport time. The valve 12 stays in closed position.

For lowering the temperature of the grapes significantly the valve 12 has to be opened. In contrary to the first possibility, where the valve 12 stays closed and there is only gaseous input, there is a significant drop in temperature with the second possibility of injecting liquid carbon dioxide.

As described before, the injection of liquid carbon dioxide can generate solid carbon dioxide (dry ice) 29 which is very favorable for cooling the grapes smoothly.

The grapes are at least inertized. Depending on the amount of carbon dioxide fed and its temperature, the grapes are additionally cooled, preferably to a temperature of 7° C. The temperature of the carbon dioxide can be varied by the valve position of the valves 12 and 13. When valve 12 is open and valve 13 is closed, the coldest temperature is achieved, whereas with valve 12 closed and valve 13 open the highest temperature can be reached. The degree of opening valve 12 is controlled as a function of the difference in temperature at each temperature measuring point, e.g. temperature measuring point 6, and the pre-set values of grape temperature.

The controller (PLC 28) is set in such a manner that the feed of carbon dioxide is stopped as soon as pump 3 is stopped or the valves 21/22 are closed or the temperature measured at 8 or 9 is too low.

When the feed of carbon dioxide is started, advantageously, at first for approximately 5 seconds only valve 13 is open (gaseous feed) while valve 12 remains closed. This prevents liquid carbon dioxide being injected at high pressure via a nozzle 26 into the connection line 24 and/or 25. After expiry of the 5 seconds, valve 12 is slowly opened up to the degree of opening pre-set by the controller (PLC 28).

The cooling effect is monitored via temperature measurements at the temperature measuring points 6, 8 and 9. If the temperature measured there falls below 7° C., the PLC 28 interrupts the feed of carbon dioxide. This reliably prevents freezing of the grapes or moisture freezing onto the connection lines.

The invention claimed is:

1. An apparatus for producing wine, comprising:
    a harvest reception vessel;
    a press coupled to the harvest reception vessel via a first connection line, wherein a first quantity of grapes from the harvest reception vessel is transported to the press via the first connection line;
    a maceration vessel coupled to the harvest reception vessel via a second connection line, wherein a second quantity of grapes from the harvest reception vessel is transported to the maceration vessel via the second connection line; and
    a controller, wherein the controller controls a supply of a gaseous carbon dioxide and a supply of a liquid carbon dioxide to the first and second connection lines and wherein the controller interrupts the supply of the carbon dioxide if a temperature of the grapes falls below 7° C.;
    wherein the controller controls the supply of the gaseous carbon dioxide and the supply of the liquid carbon dioxide to the first and second connection lines by varying a position of a first valve associated with the gaseous carbon dioxide and a second valve associated with the liquid carbon dioxide.

2. The apparatus for producing wine of claim 1, further comprising one or more temperature measuring devices.

3. The apparatus for producing wine of claim 1, wherein the varying of the position of the first valve associated with the gaseous carbon dioxide and the second valve associated with the liquid carbon dioxide varies a temperature of the first and/or second connection lines.

4. The apparatus for producing wine of claim 1, wherein when the position of the first valve associated with the gaseous carbon dioxide is open and the position of the second valve associated with the liquid carbon dioxide is closed, a highest temperature is reached.

5. The apparatus for producing wine of claim 1, wherein when the position of the first valve associated with the gaseous carbon dioxide is closed and the position of the second valve associated with the liquid carbon dioxide is open, a coldest temperature is reached.

6. The apparatus for producing wine of claim 1, wherein when a process of the supply of the gaseous carbon dioxide and the supply of the liquid carbon dioxide is started, the position of the first valve associated with the gaseous carbon dioxide is open and the position of the second valve associated with the liquid carbon dioxide is closed.

7. The apparatus for producing wine of claim 1, wherein the supply of the gaseous carbon dioxide and the supply of the liquid carbon dioxide to the first and second connection lines is controlled by a third valve associated with the first connection line and a fourth valve associated with the second connection line.

8. A process to cool harvest grapes comprising the steps of transporting the grapes to a press via a first connection line or to a maceration vessel via a second connection line, controlling a supply of a gaseous carbon dioxide and a supply of a liquid carbon dioxide to the first and second connection lines by a controller, and detecting the temperature of the grapes, wherein the supply of carbon dioxide is interrupted if the temperature of the grapes falls below 7° C. and further comprising a macerating step which lasts only a few hours;
    wherein the controller controls the supply of the gaseous carbon dioxide and the supply of the liquid carbon dioxide to the first and second connection lines by varying a position of a first valve associated with the gaseous carbon dioxide and a second valve associated with the liquid carbon dioxide.

9. The process of claim 8, wherein the varying of the position of the first valve associated with the gaseous carbon dioxide and the second valve associated with the liquid carbon dioxide varies a temperature of the first and/or second connection lines.

10. The process of claim 8, wherein when the position of the first valve associated with the gaseous carbon dioxide is open and the position of the second valve associated with the liquid carbon dioxide is closed, a highest temperature is reached.

11. The process of claim 8, wherein when the position of the first valve associated with the gaseous carbon dioxide is closed and the position of the second valve associated with the liquid carbon dioxide is open, a coldest temperature is reached.

12. The process of claim 8, wherein when a process of the supply of the gaseous carbon dioxide and the supply of the liquid carbon dioxide is started, the position of the first valve associated with the gaseous carbon dioxide is open and the position of the second valve associated with the liquid carbon dioxide is closed.

13. The process of claim 8, wherein the supply of the gaseous carbon dioxide and the supply of the liquid carbon dioxide to the first and second connection lines is controlled by a third valve associated with the first connection line and a fourth valve associated with the second connection line.

\* \* \* \* \*